United States Patent [19]

Love et al.

[11] Patent Number: 5,422,909
[45] Date of Patent: Jun. 6, 1995

[54] METHOD AND APPARATUS FOR MULTI-PHASE COMPONENT DOWNCONVERSION

[75] Inventors: Robert T. Love, Barrington; Kenneth A. Stewart, Palatine; Bryan Rapala, Mt. Prospect, all of Ill.

[73] Assignee: Motorola, Inc., Schaumburg, Ill.

[21] Appl. No.: 159,399

[22] Filed: Nov. 30, 1993

[51] Int. Cl.$^6$ .................... H04L 27/30; H03H 7/30
[52] U.S. Cl. .................... 375/200; 375/235; 375/236
[58] Field of Search ............ 375/1, 14–16, 375/10, 52–58, 77, 80, 100, 115; 342/150–152, 356; 329/304, 345; 352/103, 144, 176

[56] References Cited

U.S. PATENT DOCUMENTS

| | | | |
|---|---|---|---|
| 4,253,184 | 2/1981 | Gitlin et al. | 375/14 |
| 4,582,074 | 5/1986 | Whikehart | 375/77 |
| 5,001,724 | 3/1991 | Birgenheier et al. | 375/10 |
| 5,001,727 | 3/1991 | McDavid | 375/80 |
| 5,040,240 | 8/1991 | Keegan | 342/356 |
| 5,204,683 | 4/1993 | Auvray | 342/150 |
| 5,313,493 | 5/1994 | Dutta | 375/56 |

OTHER PUBLICATIONS

HSP43216 Halfband Filter Data Sheets, Harris Semiconductor, Jun. 1993, pp. 1–19.

HSP50016 Digital Downconverter Data Sheets, Harris Semiconductor, Nov. 1992, pp. 1–24.
"A Double Nyquist Digital Product Detector for Quadrature Sampling", IEEE Transactions on Signal Processing, vol. 49, No. 7, Jul. 1992, pp. 1670–1681.
"Quadrature Sampling with High Dynamic Range", IEEE Transactions on Aerospace and Electronic Systems, vol. AES 18, No. 4, Nov. 1982 pp. 736–739.

*Primary Examiner*—Salvatore Cangialosi
*Attorney, Agent, or Firm*—Daniel W. Juffernbruch

[57] ABSTRACT

The present invention provides a downconverter method and apparatus for downconverting a multiphase modulated signal. The downconverter can be implemented in a multi-phase receiver such as a quadrature receiver. An analog-to-digital converter (103) converts an intermediate frequency signal to a digital signal at a sampling rate. A Hilbert transformation filter (104) and a delay element (105) connected in parallel provide respective passband quadrature and in-phase components of the digital signal. A digital translator (107) alters the passband quadrature and in-phase components based on a predetermined pattern to provide a baseband quadrature signal and a baseband in-phase signal. The digital translator (107) can be a pseudorandom sequence demodulator for demodulating a code division multiple access (CDMA) signal. Various types of DC estimation can also be provided in addition to automatic gain control.

48 Claims, 5 Drawing Sheets

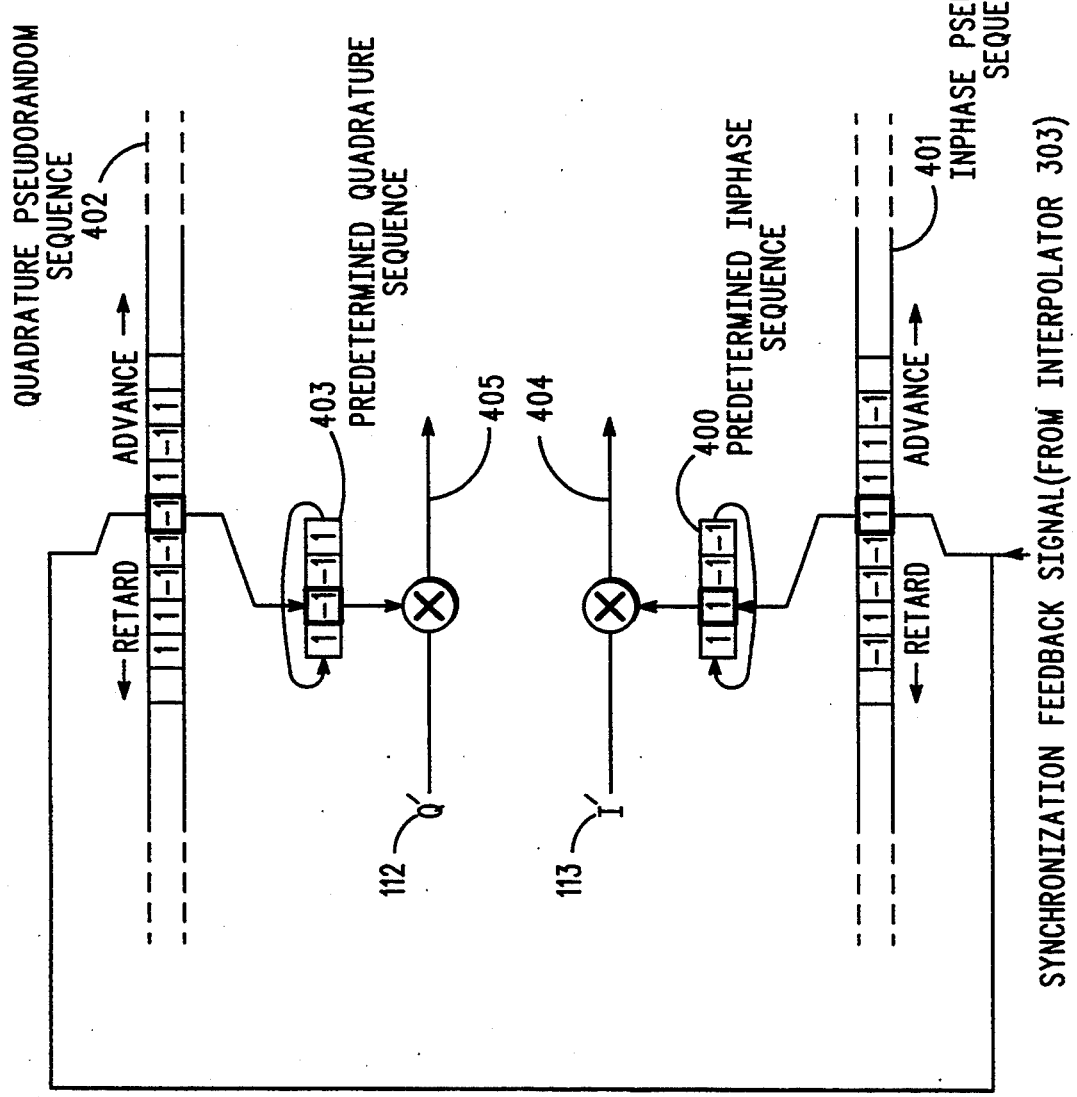

METHOD AND APPARATUS FOR MULTI-PHASE COMPONENT DOWNCONVERSION

BACKGROUND OF THE INVENTION

1. Technical Field of the Invention

The present invention relates to digital downconversion and, more particularly, to a method and apparatus for multiphase component downconversion.

2. Description of the Related Art

In a radio transmission system a transmitter generates digital symbols from digital data and transmits such symbols for the benefit of a receiver. The channel can be wireless or wired. If the channel is a radio frequency (RF) wireless channel, time dispersion can be introduced into a signal before reception at the receiver. Fading, cochanel and adjacent channel interference and noise can also be introduced into the signal.

A transmitter generates an output such as digital symbols S(n). The received signal is filtered and sampled to produce a received digital signal y(n) which is sent to a demodulator (e.g. a channel equalizer). For any type of signal modulation (e.g. FM, QPSK, OQPSK, $\pi$/4-DQPSK, GMSK, DS-CDMA) where a quadrature representation of the signal is desired, at the receiver it is necessary to provide for quadrature downconversion and elimination of signal impairments caused by the receiver and the channel.

A TDMA (Time Division Multiple Access) radio transmission is a time-shared transmission on separate timeslots 1 to N. A TDMA radio transmission can be on a single frequency carrier. A different signal sequence SS, which includes a synchronizing sequence SO and a data sequence DO with the information to be transmitted, can be transmitted in each timeslot. The signal sequence SS contains a binary signal, although the aforesaid symbols S(n) can be coded according, for instance, to the QPSK-code. In a complex number plane, with axes designated I and Q, four possible values of the symbols S(n) are marked one in each quadrant with the binary numbers 00, 01, 10, or 11.

A spread spectrum DS-CDMA (Direct Sequence - Code Division Multiple Access) radio transmission system transmits to all users at the same time and on the same channel frequency by spreading each user's signal sequence SSi with a pseudonoise (PN) sequence PNi* (*denotes complex conjugate). Each user's signal sequence is spread in such a manner that each signal can be uniquely despread at the receiver by using the corresponding synchronous PN sequence, PNi, while at the same time reducing the other users signals (interference) so that the signal quality is not impaired. In addition to, or in place of the PN sequences, a signaling set consisting of Walsh sequences can be used to further discriminate between user's signals (spread and despread) as is described, for example, in TIA/EIA IS-95 Mobile Station-Base Station Compatibility Standard for Dual-Mode Wideband Spread Spectrum Cellular System.

In a receiver there are many ways that a direct current (DC) or carrier error term can be introduced in the desired signal. In the baseband circuitry a DC term can be introduced due to operational amplifier offsets, demodulator offset voltages, and/or analog-to-digital converter characteristics. Likewise, since a coherent local oscillator (L.O.) is required for demodulating the desired signal to baseband, there can be self-demodulation of any local oscillator leakage which would then produce a baseband DC error term. If the received signal is converted to an intermediate frequency (IF) and then digitized, a similar phenomena can introduce errors especially when the local oscillator's frequency or intermediate frequencies are chosen to be either coherent or related to the bit rate (often done to simplify the sampling and processing of the signal). For most systems the DC error term (as well as any DC term which is part of the desired signal) can be eliminated by alternating current (A.C.) coupling with a cut-off frequency sufficiently low so as not to appreciably effect the content of the desired signal. However, if the receiver is automatic gain controlled, then the A.C. coupling will most likely not prove effective because the DC offset will be dynamic and most likely at a rate above the A.C. coupling cut-off frequency. This is the case in a TDMA system. In a code division multiple access (CDMA) system the DC offsets can be especially troublesome since the baseband signal has inherent DC terms which must be present to successfully demodulate the signal where the addition of other DC terms would greatly degrade demodulation performance.

Automatic gain control (AGC) can be used in a receiver to limit the required dynamic range of a receiver. Among other things, automatic gain control will limit a number of required analog-to-digital converter bits. Usually, in a TDMA system, it is desired to track signal attenuation due to lognormal fading (shadowing) rather than Rayleigh fading (fast fading). In a CDMA system, automatic gain control (AGC) sets the variance of the resultant white noise resembling composite signal as seen by the analog-to-digital converter.

Receivers typically perform quadrature downconversion upon received signals modulated in a complex plane. Quadrature downconversion can be performed in analog receivers or digital receivers such as TDMA and CDMA receivers. Quadrature downconversion from an intermediate frequency (IF) is conventionally performed, for example, in an analog receiver, by inputting a passband analog signal into two analog mixers in parallel followed by lowpass filters to eliminate double frequency signal components. Analog-to-digital converters are used to sample the resultant analog in-phase and quadrature baseband signals.

Various types of digital quadrature downconverters can also be implemented. One advantage of these digital downconverters over the analog downconverter is a reduction in the number of analog-to-digital converters required. A first type of digital downconverter, for example, requires a high speed analog-to-digital converter, followed by two digital mixers and decimation filters. Such an implementation is provided, for example, in Harris Part No. HSP 50016. A second type of digital downconverter also uses one analog-to-digital converter. The sampling frequency (fs) and final intermediate frequency (fIF) are chosen such that the samples of the signal need to be alternatingly fed with corresponding sign changes to two digital lowpass interpolating filters to obtain the desired in-phase and quadrature baseband signals. Such a digital downconverter is provided, for example, in Harris Part No. 43216 or by L. E. Pellon, "A Double Nyquist Digital Product Detector for Quadrature Sampling", *IEEE Transactions on Signal Processing*, July 1992, pp. 1670–1681.

Another type of digital downconversion uses a discrete-time Hilbert filter together with a complex downconverter state. Such a type of Hilbert downconverter is described in "Quadrature sampling with high dynamic range", *IEEE Transactions Aerospace Electronic Systems,* vol. AE8-18, no. 4, pp. 736-739, November 1982, which is incorporated herein by reference. Such a type of Hilbert downconverter also uses one less analog-to-digital converter than the analog downconverter. One less analog-to-digital converter allows one less receiver branch providing better gain balance between the in-phase and quadrature signal. The phase accuracy and gain balance of a Hilbert downconverter between the in-phase and quadrature signal components is also more accurate and not sensitive to temperature variations or aging (component drifting).

The above-mentioned first digital downconverter requires a much higher speed analog-to-digital converter than the analog downconverter. Also, the first digital downconverter requires actual high speed multiplication for mixing down the signal to extract the in-phase and quadrature baseband signals. The second digital downconverter does not require a high speed analog-to-digital converter or high speed multiplication because it uses a multiplierless final downconversion stage. The second digital approach, however, requires expensive A/D converters because of the required sampling rate. The Hilbert downconverter requires a complex mixing stage to perform downconversion. Expensive hardware or extensive processor time must be used to multiply the complex numbers.

SUMMARY OF THE INVENTION

The present invention solves these and other problems by providing a method and apparatus for multi-phase component downconversion. An analog-to-digital converter is provided to receive an intermediate frequency signal and provide a digital signal at a sampling rate. A Hilbert transformation network provides a passband quadrature component based on the digital signal provided from the analog-to-digital converter. A delay element provides a passband in-phase component based on the digital signal from the analog-to-digital converter. A digital translator alters the passband quadrature and in-phase components from the Hilbert transformation network and the delay element based on a predetermined pattern to provide the downconverted baseband quadrature and in-phase signals. According to the different embodiments, the digital translator is provided by a pseudorandom sequence demodulator. The digital translator can also be accompanied by early and late translators for downconverting code division multiple access (CDMA) signals. An automatic gain control circuit can be provided for downconverter gain control. A direct current (DC) estimator can also be provided to perform a DC estimation adjustment on the baseband quadrature and in-phase signals.

These and other constructions and features of the present invention will become more apparent from the following detailed description when read in conjunction with the accompanying drawings.

DETAILED DESCRIPTION OF THE DRAWINGS

FIG. 6 illustrates a diagram for one example of a translator in a code division multiple access (CDMA) downconverter according to the present invention.

DETAILED DESCRIPTION OF THE PREFERRED EMBODIMENTS

The present invention provides a quadrature downconverter having multiplierless downconversion stages and needing only one analog-to-digital converter. One less analog-to-digital converter is needed than the two analog-to-digital converters used for the two analog receiver branches of the analog downconverter. A lower frequency sampling rate can also be used for the analog-to-digital converter. A multiplier is also unnecessary in the present invention as was necessary in the first digital downconverter. The sampling rate fBAUD is set to an integral multiple of the intermediate frequency fIF to provide these benefits. Better gain balance between the in-phase and quadrature signal and low amplitude ripple are also achieved by the present invention. Furthermore, phase accuracy and gain balance between the in-phase and quadrature signal components are improved without temperature or aging sensitivity.

The present invention further using a Hilbert filter has an additional advantage over the other known digital approaches. The present invention takes advantage of a trade-off between 90° phase accuracy, bandwidth and the number of filter taps. In the present invention, the filter can be implemented with as few as four taps per output point pair (4× oversampling), or can be run at half the clock speed with a decimator (2× oversampling) by choosing the Hilbert filter order to be odd. Additionally, the sampling rate and the final intermediate frequency fIF can be chosen to minimize the amount of computation needed for a decimator to decimate the signal to T-spaced samples, where $1/T = fBAUD$ is the baud (symbol) rate. That is, fs=4fIF as before, but with the additional constraint that fIF=fBAUD such that the decimation is just a sample selection process with no decimation filter needed.

Figure 1:
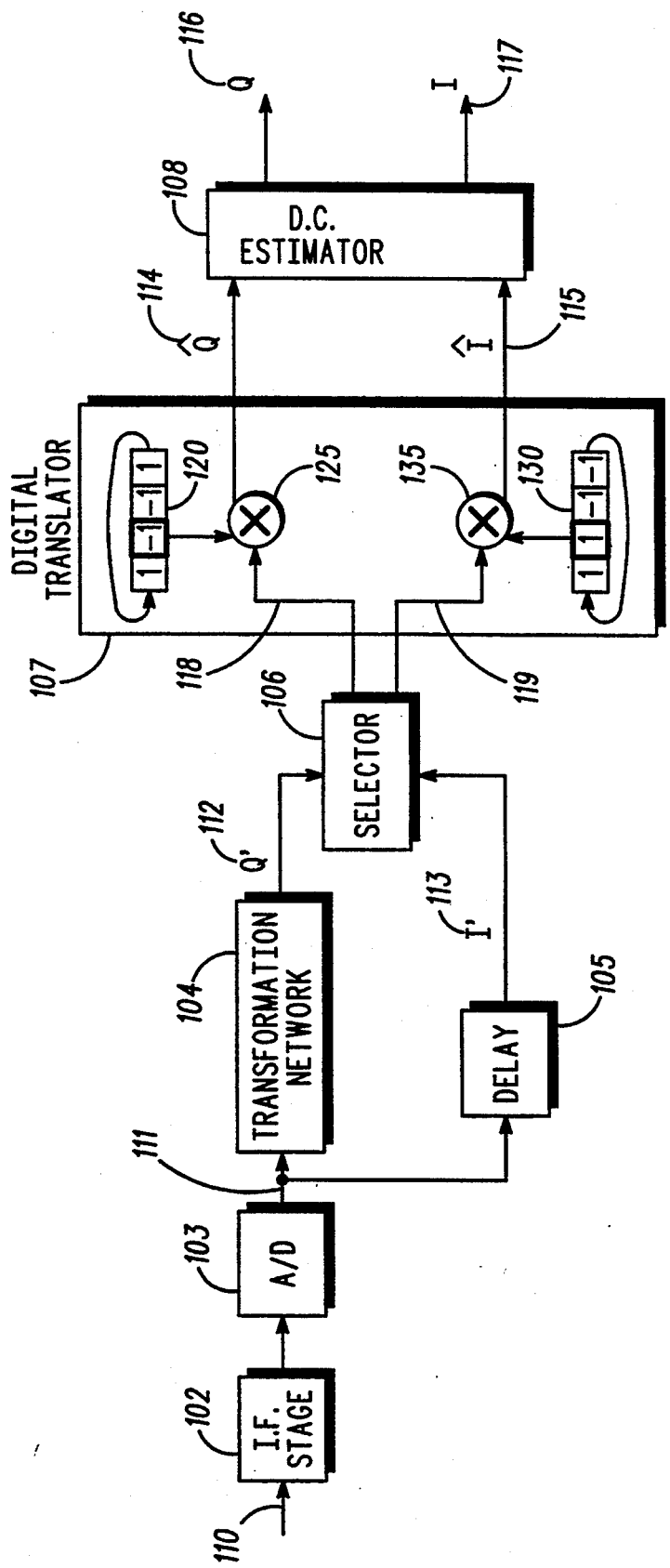
FIG. 1 illustrates a schematic block diagram of a first embodiment of a method and apparatus for multi-phase component downconversion according to the present invention.

FIG. 1 illustrates a receiver 100 that includes a downconverter after a final intermediate frequency (IF) stage 102. The downconverter includes an analog-to-digital converter 103 with enough resolution (bits) to handle the receiver dynamic range and meet quantization noise requirements. The analog-to-digital converter 103 is followed by a transformation network 104, a selector 106 and a digital translator 107. The digital translator 107 is composed of a pair of sign changing devices 125, 120 and 130, 135, one for each branch. A sign changing device contains a circular shift register 120 containing the sign information and a sign changing device for applying the sign change 125 based on the output of the masking register of the circular shift register to the corresponding passband component. The result of the digital translator 107 is the quadrature and in-phase baseband signal components 114 and 115. The quadrature and in-phase baseband signal components 114 and 115 are applied to a DC estimator/rejection circuit 108. The outputs of the DC estimator 108 are the DC free baseband quadrature and in-phase signal components.

The receiver 100 receives a signal 110, which may be an analog signal with arbitrary modulation (e.g., QPSK). This signal may also be transmitted by wire or transmission may be wireless (e.g., a RF signal). Once received, the signal 110 is processed by a final IF stage 102 which serves to translate and filter a signal from an initial or intermediate frequency (IF) to another desired final intermediate frequency (IF). The signal is also filtered to remove undesired frequency components and reduce noise and interference. The final IF frequency (fIF) is chosen as a multiple of the signal baud rate (fBAUD=1/T where T is a symbol interval). In this case the fIF is set to be equal to fBAUD for further reduction in required analog-to-digital converter sampling rates and required hardware clock speeds. The analog signal out of the IF stage 102 is then sampled by the analog-to-digital converter 103 where the sampling rate (fs) is chosen to be 4× the final IF frequency. That is, fs=4fIF, which since fIF=fBAUD then the signal is 4+ oversampled. That is, there will be 4 samples per baseband T-spaced symbol. The sampled real signal 111 is then input into the transformation network 104 to obtain the quadrature passband signal component 112. The transformation network 104 can be implemented as a Hilbert transform filter. Alternatively, the transformation network 104 can be implemented as a lowpass filter and the delay circuit as another lowpass filter. The two lowpass filters can be those in Harris Part No. 43216 or L. E. Pellon, "A Double Nyquist Digital Product Detector for Quadrature Sampling", *IEEE Transactions on Signal Processing*, July 1992, pp. 1670–1681 which are incorporated herein by reference.

The sampled real signal 111 is also sent to a delay circuit 105 where the delay is equivalent to the group delay of the transformation network 104. The delay of the delay circuit 105 is equal to an integral number of the samples processed by the transformation network 104 when, for example, a Hilbert transform filter is chosen of odd order (odd number of filter taps) for the transformation network 104. The output of the delay 105 is the passband in-phase signal component 113. The selector 106 then alternately selects quadrature 112 and then in-phase 113 passband signal component samples to feed to the quadrature branch of the digital translator 107 and at the same time alternately selects in-phase 113 and then quadrature passband signal component samples to input to the in-phase branch of the digital translator 107.

The quadrature branch samples have their signs changed by a sign changing device 125 based on the current entry in the masking register (registers in bold in FIG. 1) in the circular buffer 120 containing the quadrature translation sequence. Similarly the in-phase branch samples have their signs changed by sign changing device 135 based on the current entry in the masking register in the circular buffer 130 containing the in-phase translation sequence. These sign changing devices merely require an inversion of binary bits using either digital gates or a simple operation in a microprocessor or digital signal processor. Complex multiplication algorithms or circuits are unnecessary to merely perform a sign change thus saving hardware or processor time.

These sequences are derived from the complex process $\exp(-j\pi k/2)$ needed to translate the passband signal components to baseband signal components due to the final IF frequency and sampling frequency relationship fs=4fIF. Note, given a complex passband signal $d(kT)=I'(kT)+j\,Q'(kT)$ centered at fIF. To translate this signal to baseband requires multiplying it by the complex process $\exp(-j2\pi k fIF/fs)$. Since $fIF/fs=\frac{1}{4}$ then the process becomes $\exp(-j\pi k/2)$. Therefore, $z(kT)$ where $z(kT)=d(kT)*\exp(-j\pi k/2)$ can be written (I(0),Q(0)), (−Q(1),I(1)), (−I(2),−Q(2)), (Q(3),−I(3)) for k=0,3 where this pattern of signs and I and Q ordering repeats with this period of 4. That is, (I(0),Q(0)), (−Q(1),I(1)), (−I(2), −Q(2)), (Q(3), −I(3))

(I(4),Q(4)), (−Q(5),I(5)), (−I(6), −Q(6)), (Q(7), −I(7))

(I(8),Q(8)), (−Q(9),I(9)), (−I(10),−Q(10)), (Q(11),−I(11))

An efficient implementation of the process $\exp(-j\pi k/2)$ requiring only sign changes on alternate samples can be provided by the circular buffers 120 and 130. The circular buffer 120 and 130 respectively contain sign changing translation sequences $(1,-1,-1,1)$ and $(1,1,-1,-1)$.

The selector 106 alternately chooses samples output from the transformation network 104 and the delay circuit 105. The output of the quadrature branch of the digital translator 107 is the quadrature baseband sampled signal component 114 and the output of the in-phase branch of the digital translator 107 is the in-phase baseband sampled signal component 115.

The DC estimator 108 then efficiently estimates the DC (zero frequency) signal components from the quadrature baseband sampled signal component and subtracts them to produce a quadrature baseband sampled signal free of a DC component 116. The DC estimator block 108 at the same time efficiently estimates the DC (zero frequency) signal component from the in-phase baseband sampled signal component and subtracts them to produce a in-phase baseband sampled signal free of a DC component 117. The DC estimator 108 will be discussed below with reference to FIG. 3.

The downconverter of the present invention could easily be implemented through firmware running on a digital signal processor (DSP) with an internal or external analog-to-digital converter, or could easily be integrated into a single application specific integrated circuit (ASIC) or programmable gate array (FPGA) circuit. The downconverter of the present invention is applicable to either a TDMA or a CDMA receiver system. For a CDMA system the translator circuit 107 could be replaced by the translator circuit in FIG. 5.

Figure 2:
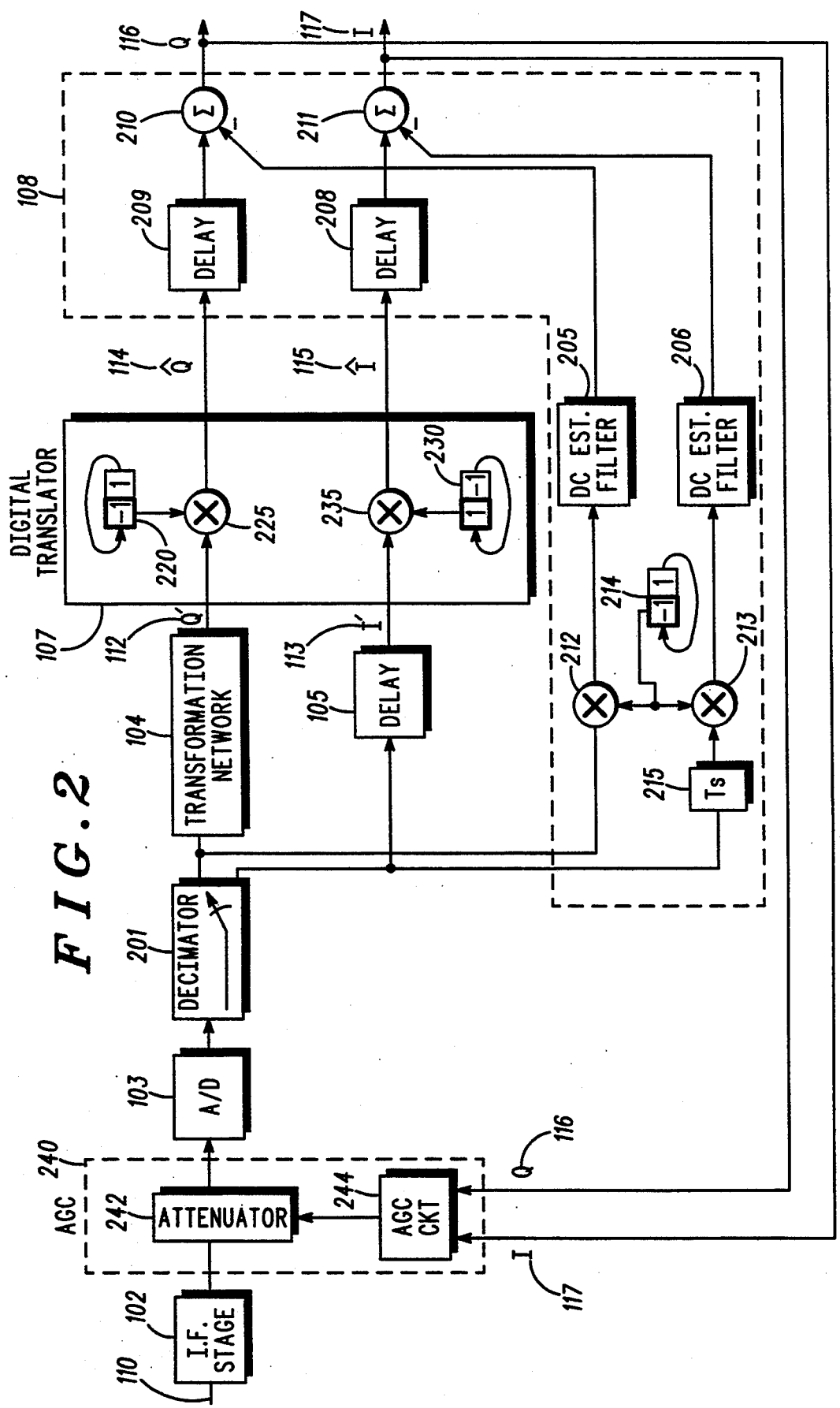
FIG. 2 illustrates a schematic block diagram of a second embodiment of a method and apparatus for multi-phase component downconversion utilizing a decimator with one type of DC estimation and with automatic gain control according to the present invention.

FIG. 2 illustrates another embodiment of the downconverter which includes decimator 201 to reduce the number of required operations per output sample. The decimator 201 precedes the transformation network 104,105 and reduces the 4fIF sampling rate to 2fIF. Automatic gain control (AGC) and DC estimation are also illustrated as examples of other features available in the various embodiments of the present invention.

The receiver receives a signal 110. An IF stage 102 filters and translates the signal to a final IF equal to the signal Baud rate (fIF=fBAUD). The signal is then gain adjusted to achieve a desired level by a digital attenuator 242 which is in turn controlled by a automatic gain control (AGC) algorithm or circuit 244. The analog signal out of the digital attenuator 242 is then sampled by the analog-to-digital converter 103 where the sampling rate (fs) is chosen to be 4× the final IF frequency as before such that the signal is 4 times (4×) oversampled.

The decimator 201 sends even samples to the transformation network 104 and odd samples to the delay 105. In this case the transformation network 104 is a Hilbert transform filter. This is possible because an odd order Hilbert filter is used which does not have a center tap. The resultant passband quadrature 112 and in-phase 113 sampled signal components are time aligned and 2× oversampled. Thus, there will be two samples per baseband T-spaced symbol.

The passband quadrature 112 and in-phase 113 sampled signal components are directly input into the digital translator 107. The quadrature signal components have their signs changed in the digital translator 107 by a sign changing device 225 based on the current entry in the masking register in the circular buffer 220 containing the quadrature translation sequence. Similarly the in-phase signal components have their signs changed by sign changing device 235 based on the current entry in the masking register in the circular buffer 230 containing the in-phase translation sequence. These sequences are derived from the complex process $\exp(-j\pi k)$ needed to translate the passband signal components to baseband signal components due to the final IF frequency and sampling frequency relationship fs=2fIF. An efficient implementation of the process $\exp(-j\pi k)$ requiring only sign changes can be provided by the circular buffers 220 and 230. The circular buffer 220 and 230 respectively contain translation sequences $(-1,+1)$ and $(-1,+1)$. Note the circular buffers could be replaced by a clocked J-K flip flop. The output of the quadrature branch of the digital translator 107 is the quadrature baseband sampled signal component and the output of the in-phase branch of the digital translator 107 is the in-phase baseband sampled signal component 115.

The DC estimator block 108 of the embodiment of FIG. 2 contains DC estimation filters 205 and 206 taking their input from the decimator 201 instead of the digital translator 107 as in the embodiment of FIG. 1. The in-phase and quadrature passband samples from the decimator 201 can also be viewed as alternating baseband in-phase and quadrature signal component samples with alternating signs. Hence, the decimator 201 provides baseband in-phase and quadrature samples to the DC estimation filters in the form

..., I(8T), −I(6T), I(4T), −I(2T), I(0)→
..., −Q(7T), Q(5T), −Q(3T), Q(T), 0

The delay 215 of the DC estimation block 108 delays the in-phase signal by one sample interval (Ts) to time align the passband in-phase and quadrature signal samples from the decimator 201. The baseband in-phase and quadrature signal samples are created by applying the sign change information in a circular buffer 214 to the decimator output samples via sign changing devices 212 and 213. The DC estimation filters 205 and 206 efficiently estimate the DC (zero frequency) signal components for the quadrature baseband 214 and in-phase baseband 207 sampled signal components and subtracts them via the summers 210 and 211 to produce a quadrature baseband 116 and in-phase baseband 117 sampled signal free of a DC component. Delay blocks 209 and 208 are provided to mainly compensate for the DC Estimation filter group delay. The delay blocks 209 and 208 have a delay equal to the DC filter group delay minus the delay of the transform network 104 and the delay circuit 105 group delay. This configuration results in a smaller overall delay through the downconverter with respect to FIG. 1. Note this type of DC estimation can also be used instead of the DC estimation type shown in FIG. 1. The DC estimation type in FIG. 1 can in turn be used instead of that shown in FIG. 2.

The automatic gain control (AGC) circuit 244 uses signals 116 and 117 to estimate the signal needed to be applied to a digital attenuator 242 to maintain a constant signal level or signal variance at the analog-to-digital converter 103. One example construction automatic gain control of the (AGC) circuit 244 for use in a TDMA system is described in FIG. 4. For a CDMA system the automatic gain control AGC circuit 244 would consist of a device to compute power by summing the square root of the sum of the squares of the in-phase and quadrature samples over a given time interval and subtracting this from a desired reference signal followed by a digital integrator. The output of the integrator may be used as an input to an AGC lookup linearization table whose output will then be applied to the attenuator. If the attenuator accepts an analog input then a digital to analog converter circuit (D/A) would also be needed. Note the automatic gain control (AGC) circuit 244 could also be used in downconverter embodiment shown in FIG. 1 by again taking signals 116 and 117 as the inputs.

Figure 3:
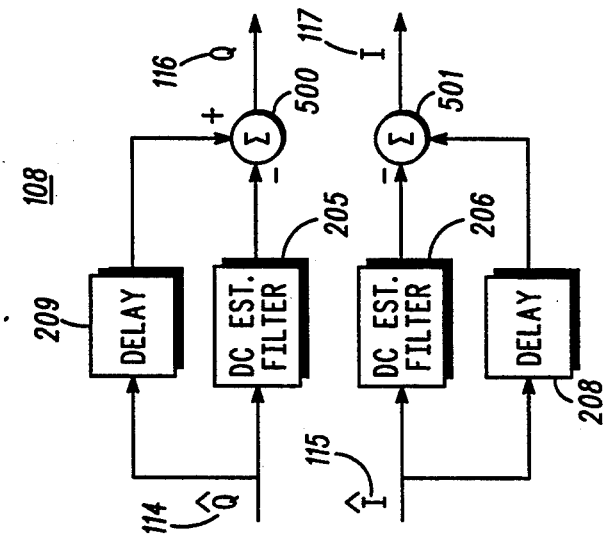
FIG. 3 illustrates a schematic block diagram of another type of DC estimation according to the present invention.

FIG. 3 illustrates an alternative construction of the DC estimator circuit 108 of either FIG. 1 or FIG. 2. Filters 205, 206 and delay blocks 208, 209 are provided, followed by their respective summation nodes 500, 501 resulting in the final DC free baseband quadrature and in-phase signal components. A sampled quadrature signal 112 is input to both the DC estimation filter 205 and a delay buffer 209 whose length is equivalent to the group delay of 205. The DC estimation filter output is subtracted from the delayed signal at the summer 500 resulting in the filtered quadrature signal 116. Similarly, a sampled in-phase 113 signal is input to both a DC estimation filter 206 and a delay buffer 208 whose length is equivalent to the group delay of 208. The DC estimation filter output is subtracted from the delayed signal at the summer 501 resulting in the filtered in-phase signal 117. Other alternative types of DC estimation filters can also be implemented in the embodiment of the present invention.

Figure 4:
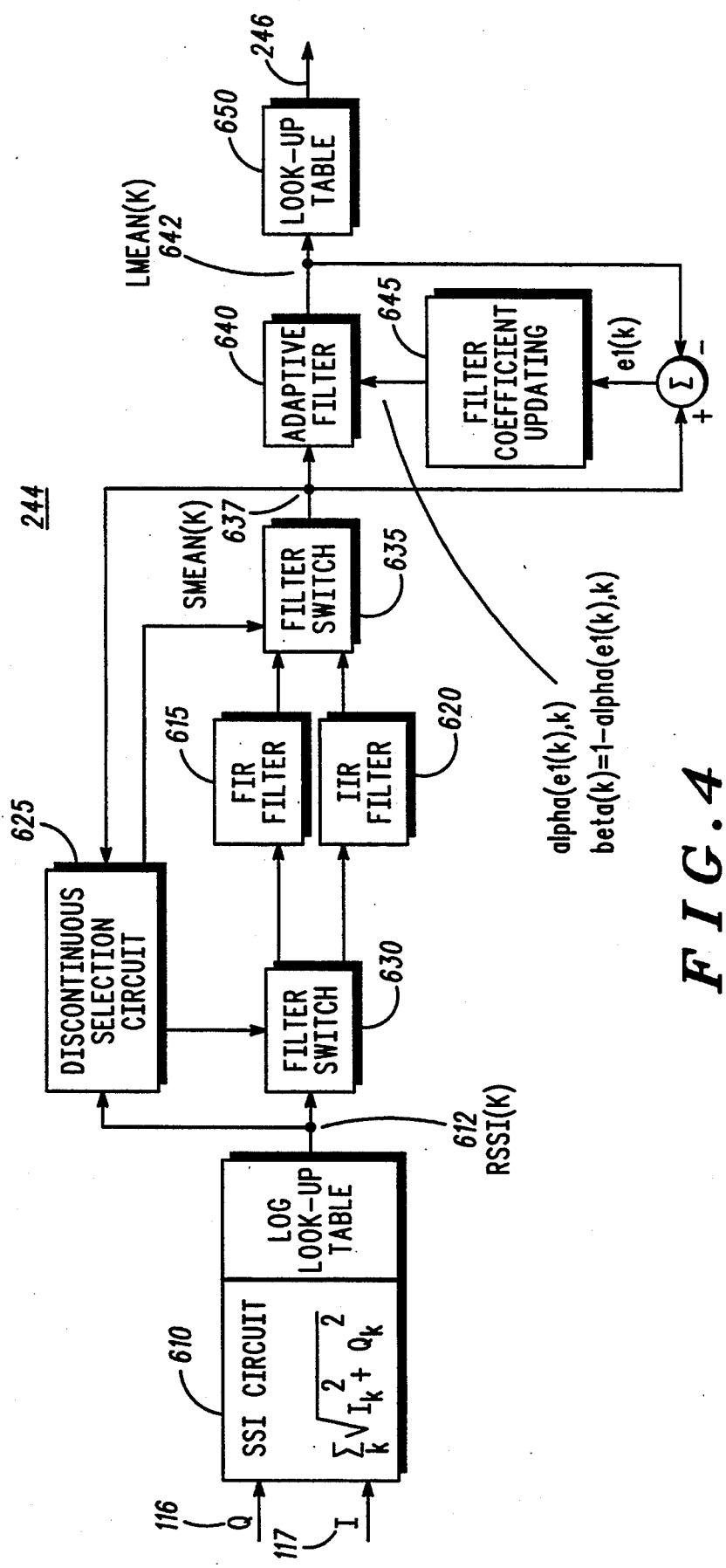
FIG. 4 illustrates a schematic block diagram providing details of one type of automatic gain control according to the present invention.

FIG. 4 illustrates a block diagram of the automatic gain control (AGC) circuit 244 according to the present invention. The illustrated lognormal tracking or Rayleigh fading rejection automatic gain control (AGC) circuit 244 consists of a signal strength indicator (SSI) circuit 610 to provide initial signal strength estimates. A discontinuous transmission detector 625 and corresponding filter switches 630, 635 are provided, as well as two short term signal power mean estimators 615 and 620. An adaptive filter or long term mean estimator 640 with corresponding filter coefficient update algorithm 645 is followed by a lookup table for linearization and/or attenuator mapping purposes. This automatic gain control (AGC) circuit 244 could also be used with the receiver in FIG. 1.

Quadrature 116 and in-phase 117 signal samples are received from the DC rejection stage 108 of a downconverter. The signal strength indicator circuit 610 receives the quadrature 116 and in-phase 117 signal samples and produces a signal strength indicator sample 612 by summing the square root of the sum of the squares of the quadrature and in-phase samples over a given time interval (e.g. 64 samples would be 16 symbol intervals if 4× oversampled). This signal then is converted to log base 10 units using a log-lookup table 610. Note that taking the square root is not necessary and, if desired, can be moved outside of the summation or additionally can be made part of the log-lookup table. The short term average estimator 615 uses the signal strength indicator sample 612 to compute a short term average signal. In this embodiment, the short term average estimator 615 is a 5 tap finite impulse response (FIR) rectangular filter (this is equivalent to a 5 point moving average). The previous average lock estimator 620 uses the signal strength indicator signal 612 to produce a previous average lock signal. In this embodiment, the previous average lock estimator 620 is a single pole infinite impulse response (IIR) filter. Filter switches 630 and 635 select either the present short term average signal from the FIR filter 615 or the previous average lock signal from the IIR filter 620 to provide a short term average signal 637.

The discontinuous transmission (DTX) selection circuit 625 looks at the current signal strength indicator sample 612 (RSSI) and the short term average signal 637 (SMEAN) and compares the difference to a threshold (DTXTHR) to determine if discontinuous transmission has occurred as shown by the following relation:

SMEAN>RSSI+DTXTHR.

That is, in order to avoid tracking the drops in the RF signal level due to discontinuous transmission, the automatic gain control algorithm tracks deep negative fades more slowly than other negative and positive fades. This is accomplished be modifying the short term average so that it is updated using a single pole IIR filter with a pole very close to 1 for slow tracking.

If discontinuous transmission is detected by the discontinuous transmission selection circuit 625, the discontinuous transmission selection circuit 625 sets the filter switches 630 and 635 so that the previous average lock signal (due to the single pole IIR filter) is chosen as the short term average signal 637 (SMEAN). Otherwise, the filter switches 630 and 635 are set to the FIR filter 615 such that the present short term average signal is chosen as the short term average signal 637 (SMEAN). The discontinuous transmission selection circuit 625 can contain a counter to perform control of the switches 630 and 635. Each time the above relation is true for a given timeslot, the counter (DTXCNTR) (initially set to zero), is incremented to count the total number of a given user's timeslots having discontinuous transmission. The counter (DTXCNTR) is decremented (until zero) each time the above relation is not true. The counter (DTXCNTR) is used to determine if discontinuous transmission has occurred in the near past and is used to speed convergence. A return to normal operation in that the FIR filter is used to update the short term average signal 637 (SMEAN) also occurs when the relation above is not true.

Another feature of this automatic gain control (AGC) circuit is its sensitivity to large positive changes in RF signal level. If the RF signal level jumps such that the short term average signal 637 (SMEAN) exceeds the long term mean (LMEAN) by a fixed amount INITTHR (typically set to 6 dB) or if discontinuous transmission has just finished, as expressed by the following two relations

SMEAN>LMEAN+INITTHR or

RSSI>LMEAN and DTXCNTR>4 then the entire automatic gain control algorithm is re-initialized by the filter switch 620 with the short term average signal (SMEAN) as the current signal strength indicator sample (RSSI) 612. This is done to speed convergence when tracking large RF signal level changes not due to fading or of mobile origination when there is no signal strength history to initialize the automatic gain control algorithm. The short term average signal (SMEAN) is used for long term average estimation mainly by an adaptive filter 640 and filter coefficient update algorithm 645. The adaptive filter 640 and filter coefficient update algorithm 645 computes a long term average signal 642 (LMEAN) and a lookup table 650 is used to produce the feedback gain control signal 246. This feedback gain control signal 246 represents the estimated signal strength with the fading component filtered out.

Note that there are several reasons not to instead track the Rayleigh component. One reason is that the fading frequency is so high that it is not practical to sample the signal at such a high rate to estimate the signal strength or provide automatic gain control with a feedback loop fast enough to compensate for the fading. Also, many receivers correct for fading via the synchronization words transmitted by almost all TDMA systems in each timeslot, sometimes in conjunction with a channel equalizer.

The adaptive filter 640 of the present invention is a one pole IIR filter with coefficients updated by the filter coefficient update algorithm 641 where k is a time index and alpha and beta are time varying coefficients of the adaptive filter 640 as follows $$LMEAN(k) = alpha(e1(k),k) * LMEAN(k-1) + beta(k) * SMEAN(k) \quad beta(k) = (1-alpha(e1(k),k))$$

This algorithm uses an error signal computed by subtracting the long term average signal 642 from the short term average signal 637. As these signal values diverge (magnitude of error signal increases) the coefficients are adjusted such that the filter pole moves closer in a prescribed manner to the origin of the unit circle. For example, one method is to change the coefficient alpha (el(k),k) by a fixed step size CSTEP (0.005 for example) depending on whether the magnitude of the error signal $|el(k)|$ is greater than or less than some divergence threshold DIVTHR.

if $|el(k)|$>DIVTHR  alpha(el(k),k)=MIN(alpha(el(k),k−1)+CSTEP, Max Allowed alpha)
else  alpha(el(k),k)=MAX(alpha(el(k),k−1)−CSTEP, Min Allowed alpha)

Another alternative method is to increment and decrement a pointer into a look-up table containing coefficients.

Divergence makes the adaptive filter 640 weight the input 637 more heavily than the previous value of the long term average signal 642 (LMEAN) in computing the next value of the long term average. That is, variations in the long term mean can be tracked more rapidly. Another way to look at this is that the IIR filter is a sequential exponential averager which weights the older samples making up the mean estimate exponentially less than the new samples. The degree to which these samples are weighted depends on the filter coefficients (or how close the pole is to 0 or 1). The closer the pole of the adaptive filter 640 is to 0 the more heavily it weights the current short term average signal with respect to the previous long term average signal value and hence the larger variations can be tracked in the signal strength average due to lognormal fading. The pole of the adaptive filter 640 must not be allowed to move too close to the origin or the estimate will degrade, i.e., the estimate will begin to track the fading component of the long term average signal (LMEAN). Also, if the pole of the adaptive filter 640 remains too close to unity, it also degrades the long term average signal (LMEAN) for it will fail to track variations in the lognormal fading component of the long term average signal strength estimate. Each contiguous sample that the short term average signal (SMEAN) and the long term average signal (LMEAN) stay within a prescribed distance of each other, the more the pole of the adaptive filter 640 is moved closer in a prescribed manner to 1 resulting in a steady expansion of the exponentially weighted averaging window. To keep the system dynamic (adaptable) the pole is also not allowed to become smaller than some fixed value above zero. Finally, the long term mean estimate signal 642 is applied to the lookup table 650 to produce a feedback gain control signal 246 compensated for receiver nonlinearities and/or for attenuator mapping purposes.

Figure 5:
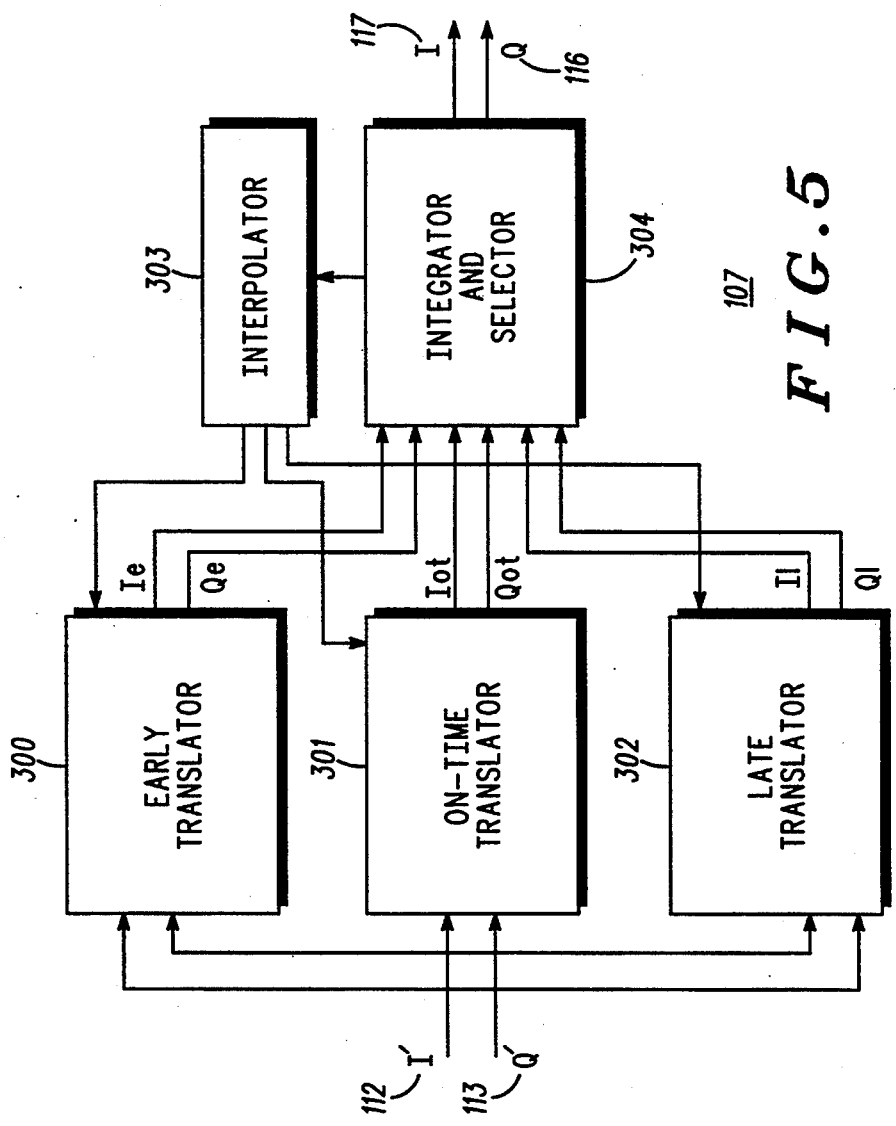
FIG. 5 illustrates a schematic block diagram of additional early and late translators used for downconversion of a code division multiple access (CDMA) signal according to the present invention.

FIG. 5 illustrates a block diagram showing the translation circuit 107 used in one embodiment of the invention directed to code division multiple access (CDMA) signals. This translation circuit would be used in place of the digital translator 107 shown in FIG. 1, or could also be used in FIG. 2, but with the decimation stage removed. This translator circuit provides an early translator block 300, a late translator block 302, and an on-time (estimate) translator block 301 followed by a selection and integration block 304 whose outputs include a feedback signal input to a interpolator block 303 which generates a synchronization feedback signal input to each translator block. The passband in-phase 113 and quadrature 112 signals are input to the early translator block 300, the late translator block 302, and the on-time translator block 301. In these blocks, the signals are translated to baseband and despread as will later be described in reference to FIG. 6. The signals are both translated and despread at the same time by combining the sign information from the in-phase pseudorandom (PN) sequence 401 and quadrature pseudorandom sequence 402 and from the predetermined in-phase sequence 400 and predetermined quadrature sequence 403, in the manner:

| Pseudorandom Sequence | Predetermined Sequence | Resulting Sign |
|---|---|---|
| + | + | + |
| + | − | − |
| − | + | − |
| − | − | + |

The predetermined sequences 400 and 403 can be translation or frequency shift sequences.

The sign changing devices 404 and 405 apply the resultant sign change to the passband in-phase 113 and quadrature 112 signals respectively. In general, the despreading sequence is shifted a different number of pseudorandom chip samples in each translator block. In the "early" translator block 300, the pseudorandom sequence is delayed by 1 chip sample, and in the "late" translator block 302 the pseudorandom sequence is shifted ahead by 1 chip sample with respect to the pseudorandom sequences of the "on-time" translator block 301. A chip is the samples that result from spreading the signal with the pseudorandom sequence. (1 chip sample=1/M chips where M is the number samples per chip and M=4 because fs=4fIF and fIF=chip rate (fCHIP)). The overall entry point into the pseudorandom sequence is governed by the synchronization feedback signal from an interpolator 303 to each translator block. The interpolator 303 determines whether to advance or retard pseudorandom entry pointer based on a feedback signal from a selection/integration block 304 and based on an amount of despreading needed.

Despreading can be defined as the: number of pseudorandom chips (K for example) that must be integrated to make up a symbol chip. For example, for a cellular radio base station receiver according to the IS-95 specification, 4 pseudorandom chips would make up 1 Walsh symbol chip (K=4). For example, for a mobile receiver according to the IS-95 specification, 64 Walsh chips would make 1 symbol. Note that the entry pointers mentioned digital signal processor are for a (DSP) implementation. For a hardware implementation, an extra clock pulse (advance) or clock pulse inhibit (retard) could be used to update the pseudorandom generator.

The selection/integration block 304 takes the resultant baseband despread quadrature and in-phase signals from each translator block and integrates them over N chips where N is the number of samples taken for K pseudorandom chips to produce the despread symbol chip. The resulting symbol chip magnitudes from each translator block are computed and sent to the interpolator 303 where they are lowpass filtered with a group delay less than the time it takes for the pseudorandom synchronization point to change due to a position change of a moving mobile radio.

At the interpolator 303 these filtered magnitudes are compared to decide whether to advance or retard by 1 pseudorandom chip sample. Normally the interpolator 303 points via the synchronization feedback signal to a given pseudorandom chip for K cycles (sample intervals), and then advances the pointer to the next pseudorandom chip. In addition, if the filtered magnitude of the early translator is the largest, then the synchronization feedback signal would cause the pointers of all three of the translators to be retarded by one chip sample. If the filtered magnitude of the "on-time" translator is the largest, then the synchronization feedback signal would leave the entry pointers unchanged. If the filtered magnitude of the "late" translator is the largest, then the synchronization feedback signal would cause the entry pointers to advance by one chip sample.

This CDMA translation procedure could be improved by increasing the number of early and late translator blocks so more chip samples could be covered. Interpolating between the filtered magnitudes corresponding to more chip samples would improve the accuracy of the synchronization feedback signal (advance/retard decision). The baseband integrated (despread) quadrature and in-phase signal from the on-time translator block is output by the selection/integration block 304 as the baseband despread quadrature 116 and in-phase signals 117 as shown in FIG. 5.

FIG. 6 is a block diagram illustrating details of a translator circuit for other CDMA embodiments of the invention or for the translator circuits of FIGS. 1, 2 or 5. The passband quadrature, and in-phase inputs 112 and 113 are shown as inputs to sign changing devices 405 and 404. The sign changing devices are supplied with the current sign information from the circular buffers 403 and 400 containing a predetermined sequence for translation. The sign information from the circular buffers 403 and 400 is then modified by the sign information obtained from corresponding pseudorandom sequence 402 or 401. Also shown is the application of an advance/retard signal for selection of the appropriate pseudorandom sequence sign bit to apply. This advance/retard signal can be provided, in the example of FIG. 5, from the interpolator 303.

An alternative embodiment for pseudonoise (PN) despreading of a code division multiple access (CDMA) signal can also be implemented as follows. The preceding description in FIG. 6 assumed that separate real operations could be used to pseudonoise despread the in-phase and quadrature signals. This most likely would only be acceptable when using a Gaussian channel or a channel which does not cause a random phase shift of the signal. For a more realistic channel (an R.F. channel, for example) a complex operation is necessary to despread the signal. For example, the IS-95 specification requires that the signal is despread by the complex conjugate of the pseudonoise sequence, thus requiring that a complex mathematical operation is performed. A complex pseudorandom sequence is formed by inphase and quadrature pseudorandom sequences, representable by a complex number, i.e., $a+jb$.

The complex spreading of the pseudorandom sequence (after the logical to arithmetic mapping 0 to 1 and 1 to $-1$) applied to the received signal takes one of a set of four complex values ($1+j1$, $-1+j1$, $1-j1$, $1-j1$). The transmit pseudorandom sequence used to spread the information signal before transmission is generated from the complex pseudorandom sequence (e.g., sequences 402 and 401 in FIG. 6) used at the receiver. The transmit pseudorandom sequence is generated by simply negating (i.e. logically inverting) the quadrature component (e.g., 402) of the complex pseudorandom sequence.

This simpler mathematical operation is possible because the pseudorandom sequence can be rotated by a constant, but arbitrary, complex phase rotation without impact on the demodulation process. The rotation can be chosen to be $+\pi/4$ radians thereby mapping the possible values which the pseudorandom sequence may take from a set of four complex values ($1+j0$, $0+j1$, $-1+j0$, $0-j1$). Only in a coherent system would the rotation have to be accounted for in the demodulation process which could be as simple as modifying decision boundaries resulting in no additional operations.

In a receiver which is performing both digital down-conversion and quadrature pseudorandom despreading, the downconverter and despreader may be combined to from an efficient composite device different from the one described above in FIG. 6. Such a device differs in that now the pseudorandom sequences and the predetermined sequences can act as inputs to a decoding block. The decoding block may be implemented by lookup table or simple logical function minimization. An output of the decoding block controls operation of the selector 106, for example, of FIG. 1. Such control would determine when to swap the in-phase and quadrature samples. The output of the decoding block additionally controls operation of sign changing devices 125 and 135 of FIG. 1, 225 and 235 of FIG. 3, or 405 and 404 of FIG. 6, for example. The signals in such an implementation are summarized by the following table.

| IPN (401) | QPN (402) | PIS (400) | PQS (403) | PS OP | PN OP | NET OP | I + jQ | I sign (404) | Q sign (405) | Selector (106) |
|---|---|---|---|---|---|---|---|---|---|---|
| 0 | 0 | 0 | 0 | 1 | 1 | 1 | I + jQ | + | + | 0 |
| 0 | 0 | 0 | 1 | j | 1 | j | −Q + jI | − | + | 1 |
| 0 | 0 | 1 | 0 | −j | 1 | −j | Q − jI | + | − | 1 |
| 0 | 0 | 1 | 1 | −1 | 1 | −1 | −I − jQ | − | − | 0 |
| 0 | 1 | 0 | 0 | 1 | j | j | −Q + jI | + | + | 1 |
| 0 | 1 | 0 | 1 | j | j | −1 | −I − jQ | − | − | 0 |
| 0 | 1 | 1 | 0 | −j | j | 1 | I + jQ | + | + | 0 |
| 0 | 1 | 1 | 1 | −1 | j | −j | Q − jI | + | − | 1 |
| 1 | 0 | 0 | 0 | 1 | −j | −j | Q − jI | + | − | 1 |
| 1 | 0 | 0 | 1 | j | −j | 1 | I + jQ | + | + | 0 |
| 1 | 0 | 1 | 0 | −j | −j | −1 | −I − jQ | − | − | 0 |
| 1 | 0 | 1 | 1 | −1 | −j | j | −Q + jI | − | + | 1 |
| 1 | 1 | 0 | 0 | 1 | −1 | −1 | −I − jQ | − | − | 0 |
| 1 | 1 | 0 | 1 | j | −1 | −j | Q − jI | + | − | 1 |
| 1 | 1 | 1 | 0 | −j | −1 | j | −Q + jI | − | + | 1 |
| 1 | 1 | 1 | 1 | −1 | −1 | 1 | I + jQ | + | + | 0 |

Generally, the present invention provides a method and apparatus for down-conversion and quadrature demodulation of digital signals. This is accomplished by a single analog-to-digital converter operating at a sampling rate of 4/T Hz (T is the modulation scheme symbol interval). The analog-to-digital converter samples a real-valued passband modulated waveform centered at 1/T Hz. The sampled data stream passes through a Hilbert transformer (phase splitter) to obtain an analytic passband signal containing the upper frequency sideband of the original signal. The quadrature part of the Hilbert transformer is a filter with as few as 4 distinct non zero taps while the in-phase or real part of the transformer is just a delay. The down-conversion process following the Hilbert transformer requires multiplication by the complex process $\exp(-j\pi k/2)$ because of the final IF frequency and sampling frequency relationship fs=4fIF. The process is efficiently performed without multiplies by a selector and digital translator circuit which multiplexes and performs sign changes of the passband in-phase and quadrature signal component samples to obtain the baseband in-phase and quadrature signal component samples. DC estimation and removal is performed concurrently or after this process as well as AGC. With such a method and apparatus a substantially digital downconverter can be obtained without separately digitizing the in-phase and quadrature components, said downconverter circuit performs in a computationally efficient manner and with the ability to remove or compensate for some receiver (DC removal) and channel impairments (AGC with fading rejection). The DC estimation circuits are also designed to be computationally efficient such that they require very few arithmetic operations.

Although the invention has been described and illustrated in the above description and drawings, it is understood that this description is by example only and that numerous changes and modifications can be made by those skilled in the art without departing from the true spirit and scope of the invention. For instance, different forms of DC estimation can be applied to any of the embodiments of the present invention including the various TDMA and CDMA embodiments. Further, the present invention can be provided with or without a decimator. Different types of pseudonoise despreading in a CDMA system are also possible. Different automatic gain control (AGC) circuits can also be applied to either the TDMA or CDMA systems. Further, the downconverter can be implemented with or without a decimator.

What is claimed is:

1. A downconverter, comprising:
    an analog-to-digital converter operatively coupled to receive an intermediate frequency signal and to provide a digital signal at a sampling rate;
    a Hilbert transformation network operatively coupled to said analog-to-digital converter to provide a passband quadrature component of the digital signal;
    a delay element operatively coupled to said analog-to-digital converter to provide a passband in-phase component of the digital signal; and
    a digital translator operatively coupled to said Hilbert transformation network and said delay element to alter the passband quadrature and passband in-phase components based on at least one predetermined pattern to provide a baseband quadrature signal and a baseband in-phase signal.

2. A downconverter according to claim 1, further comprising a selector operatively coupled to said Hilbert transformation network and said delay element to alternately select the passband quadrature component and the passband in-phase component to provide selected components of the passband quadrature component and passband in-phase component to said digital translator.

3. A downconverter according to claim 2, wherein said digital translator comprises:
    a quadrature translator operatively coupled to receive the selected passband quadrature components from said selector and to alter the selected passband quadrature components based on a first predetermined pattern to provide the baseband quadrature signal; and
    an in-phase translator operatively coupled to receive the selected passband in-phase components from said selector to alter the passband inphase components based on a second predetermined pattern to provide the baseband in-phase signal.

4. A downconverter according to claim 1, further comprising a decimator operatively coupled to receive the digital signal from said analog-to-digital converter and alternately provide the digital signal to said transformation network and said delay element.

5. A downconverter according to claim 4, wherein said digital translator comprises:
    a quadrature translator operatively coupled to said Hilbert transformation network to alter the passband quadrature component based on a first predetermined pattern to provide the baseband quadrature signal; and
    an in-phase translator operatively coupled to said delay element to alter the passband in-phase component based on a second predetermined pattern to provide the baseband in-phase signal.

6. A downconverter according to claim 1, wherein said digital translator further comprises a pseudorandom sequence demodulator operatively coupled to said transformation network and said delay element to alter the passband quadrature and passband in-phase components based on both the predetermined pattern and a pseudorandom sequence to provide the baseband quadrature signal and the baseband in-phase signal.

7. A downconverter according to claim 1, further comprising:
    an early translator operatively coupled to said Hilbert transformation network and said delay element to alter the passband quadrature and passband in-phase components based on a predetermined pattern to provide an early baseband quadrature signal and an early baseband in-phase signal;
    a late translator operatively coupled to said Hilbert transformation network and said delay element to alter the passband quadrature and passband in-phase components based on a predetermined pattern to provide a late baseband quadrature signal and a late baseband in-phase signal; and
    a selector operatively coupled to said early translator, said late translator and said digital translator to select the baseband quadrature signal and the baseband in-phase signal from one of said early, late and digital translators based on a quality of the selected signals.

8. A downconverter according to claim 1, wherein the components consist of binary numbers and wherein said digital translator changes a sign of the binary numbers according to the predetermined pattern.

9. A downconverter according to claim 1, wherein the sampling rate of said analog-to-digital converter is 4× the intermediate frequency of the intermediate frequency signal.

10. A downconverter according to claim 1, further comprising an automatic gain control circuit comprising:
    a signal strength indicator circuit operatively coupled to receive the baseband quadrature signal and the baseband in-phase signal and to produce a signal strength indicator signal representative thereof;
    a short term average estimator operatively coupled to receive the signal strength indicator signal and produce a short term average signal; and
    an adaptive long term average estimator operatively coupled to receive the short term average signal from said average signal selector switch to provide a long term average signal as a basis for the feedback gain control signal.

11. A downconverter according to claim 10, wherein said short term average estimator comprises:
    a present short term average estimator operatively coupled to receive the signal strength indicator signal and produce a present short term average signal;

a previous average lock estimator operatively coupled to receive the signal strength indicator signal and produce a previous average lock signal;

an average signal selector switch operatively coupled to select one of the present short term average from said present short term average estimator and the previous average lock signal from said previous average lock estimator to provide a short term average signal; and discontinuous transmission detection circuit operatively coupled to said signal strength indicator circuit and said average signal selector switch to detect a discontinuous transmission on the baseband quadrature signal and the baseband in-phase signal to control said average signal selector switch.

12. A receiver, comprising:

an analog-to-digital converter operatively coupled to sample an intermediate frequency signal at a sampling rate and provide a digital signal;

a first transformation network operatively coupled to said analog-to-digital converter to provide a passband quadrature component of the digital signal;

a second transformation network operatively coupled to said analog-to-digital converter to provide a passband in-phase component of the digital signal;

a digital translator operatively coupled to said first transformation network and said second transformation network to alter the passband quadrature and passband in-phase components based on at least one predetermined pattern to provide a baseband quadrature signal and a baseband in-phase signal; and a DC estimator operatively coupled to substantially eliminate DC from the baseband quadrature signal and the baseband in-phase signal.

13. A receiver according to claim 12, wherein said DC estimator comprises:

a first delay element operatively coupled to receive the baseband quadrature component from said digital translator;

a first adder operatively coupled to said first delay element;

a second delay element operatively coupled to receive the in-phase quadrature component from said digital translator;

a second adder operatively coupled to said second delay element;

a first DC estimation filter operatively coupled to receive the baseband quadrature component from said digital translator and provide an output to said first adder; and a second DC estimation filter operatively coupled to receive the inphase quadrature component from said digital translator and provide an output to said second adder.

14. A receiver according to claim 12, wherein said receiver further comprises a distribution switch operatively coupled to said analog-to-digital converter to receive the digital signal; and wherein said DC estimator comprises:

a first delay element operatively coupled to receive the baseband quadrature component from said digital translator;

a first adder operatively coupled to said first delay element;

a second delay element operatively coupled to receive the in-phase quadrature component from said digital translator;

a second adder operatively coupled to said second delay element;

a first DC estimation filter operatively coupled to said distribution switch to provide an output to said first adder; and a second DC estimation filter operatively coupled to said distribution switch and provide an output to said second adder.

15. A receiver according to claim 12, further comprising a selector operatively coupled to alternately select the passband quadrature component and the passband in-phase component from said first transformation network and said second transformation network to provide selected components of the passband quadrature and passband in-phase components to said digital translator.

16. A receiver according to claim 12, further comprising a decimator operatively coupled to alternately provide the digital signal from said analog-to-digital converter to said first transformation network and said second transformation network.

17. A receiver according to claim 16, wherein said DC estimator comprises:

a first delay element operatively coupled to receive the baseband quadrature component from said digital translator;

a first adder operatively coupled to said first delay element;

a second delay element operatively coupled to receive the in-phase quadrature component from said digital translator;

a second adder operatively coupled to said second delay element;

a first DC estimation filter operatively coupled to said decimator to provide an output to said first adder; and a second DC estimation filter operatively coupled to said decimator to provide an output to said second adder.

18. A receiver according to claim 12, wherein the components consist of binary numbers and wherein said digital translator changes a sign of the binary numbers according to the predetermined pattern.

19. A receiver according to claim 12, wherein said receiver is a TDMA receiver.

20. A receiver according to claim 12, wherein said receiver is a CDMA receiver; and wherein said digital translator further comprises a pseudorandom sequence demodulator operatively coupled to said first transformation network and said second transformation network to alter the passband quadrature and passband in-phase components based on both the predetermined pattern and the pseudorandom sequence to provide the baseband quadrature signal and the baseband in-phase signal.

21. A receiver according to claim 20, further comprising:

an early translator operatively coupled to said first transformation network and said second transformation network to alter the passband quadrature and passband in-phase components based on a predetermined pattern to provide an early baseband quadrature signal and an early baseband in-phase signal;

a late translator operatively coupled to said first transformation network and said second transformation network to alter the passband quadrature and passband in-phase components based on a predetermined pattern to provide a late baseband quadrature signal and a late baseband in-phase signal; and a selector operatively coupled to said early translator, said late translator and said digital translator to select the baseband quadrature signal and the baseband in-phase signal from one of said early, late and digital translators based on a quality of the selected signals.

22. A CDMA receiver, comprising:

analog-to-digital converting means for sampling an IF signal at a sampling rate to provide a digital signal;

transformation means for transforming the digital signal to provide a passband quadrature component of the digital signal and a passband in-phase component of the digital signal; and translator means for altering and despreading the passband quadrature and passband in-phase components based on both a predetermined pattern and a pseudorandom sequence to provide a baseband quadrature signal and a baseband in-phase signal.

23. A method for down-converting a signal, the method comprising the steps of:

(a) sampling an intermediate frequency signal at a sampling rate to produce a digital signal;

(b) transforming the digital signal to produce a passband quadrature component;

(c) delaying the digital signal to produce a passband in-phase component; and (d) altering the passband quadrature and passband in-phase components based on at least one predetermined pattern to provide a baseband quadrature signal and a baseband in-phase signal.

24. A method according to claim 23, further comprising the step of:

(e) alternately selecting the passband quadrature component and the passband in-phase component to provide selected components of the passband quadrature component and passband in-phase component.

25. A method according to claim 23, further comprising the step of:

(e) decimating the digital signal before transforming and delaying the digital signal in said steps (b) and (c).

26. A method according to claim 23, wherein said step (d) comprises the substep of:

(d1) pseudorandom sequence demodulating the passband quadrature and passband in-phase components based on both the predetermined pattern and a pseudorandom sequence to provide the baseband quadrature signal and the baseband in-phase signal.

27. A method according to claim 26, wherein said step (d) further comprises the substeps of:

(d2) early pseudorandom sequence demodulating the passband quadrature and passband in-phase components based on both the predetermined pattern and an early pseudorandom sequence to provide an early baseband quadrature signal and an early baseband in-phase signal;

(d3) late pseudorandom sequence demodulating the passband quadrature and passband in-phase components based on both the predetermined pattern and a late pseudorandom sequence to provide a late baseband quadrature signal and a late baseband in-phase signal; and (d4) selecting the baseband quadrature signal and the baseband in-phase signal from one of said steps (d1), (d2) or (d3) based on a quality of the selected signals.

28. A method according to claim 23, wherein said step (a) comprises the substep of:

(a1) sampling the intermediate frequency signal, at a sampling rate an integral multiple of an intermediate frequency of the intermediate frequency signal, to produce the digital signal.

29. A method according to claim 23, wherein said step (d) comprises the substep of:

(d1) changing a sign of the passband quadrature and passband in-phase components based on at least one predetermined pattern to provide a baseband quadrature signal and a baseband in-phase signal 30. A method according to claim 23, further comprising the step of:

(e) performing DC estimation to substantially eliminate DC from the baseband quadrature signal and the baseband in-phase signal.

31. A method according to claim 30, wherein said step (e) further comprises the steps of:

(e1) delaying the baseband quadrature component;

(e2) adding a first DC estimate value to the quadrature baseband component delayed in said step (e1);

(e3) delaying the in-phase quadrature component;

(e4) adding a second DC estimate value to the in-phase baseband component delayed in said step (e3);

(e5) DC estimation filtering the baseband quadrature component from the altering in said step (d) to provide the first DC estimate value; and (e6) DC estimation filtering the baseband in-phase component from the altering in said step (d) to provide the second DC estimate value.

32. A method according to claim 30, wherein said step (e) further comprises the steps of:

(e1) delaying the baseband quadrature component;

(e2) adding a first DC estimate value to the quadrature baseband component delayed in said step (e1);

(e3) delaying the in-phase quadrature component;

(e4) adding a second DC estimate value to the in-phase baseband component delayed in said step (e3);

(e5) selecting the digital signal after said step (a) to provide first and second digital signals;

(e6) DC estimation filtering the first digital signal selected in said step (e5) to provide the first DC estimate value; and (e7) DC estimation filtering the second digital signal selected in said step (e5) to provide the second DC estimate value.

33. A downconverter, comprising:

an analog-to-digital converter operatively coupled to receive an intermediate frequency signal and to provide a digital signal at a sampling rate;

a Hilbert transformation network operatively coupled to said analog-to-digital converter to provide a passband quadrature component of the digital signal;

a delay element operatively coupled to said analog-to-digital converter to provide a passband in-phase component of the digital signal; and a digital translator operatively coupled to said Hilbert transformation network and said delay element to alter the passband quadrature and passband in-phase components based on at least one time variant predetermined pattern to provide a baseband quadrature signal and a baseband in-phase signal.

34. A downconverter according to claim 33, further comprising a selector operatively coupled to said Hilbert transformation network and said delay element to alternately select the passband quadrature component and the passband in-phase component to provide selected components of the passband quadrature component and passband in-phase component to said digital translator.

35. A downconverter according to claim 34, wherein said digital translator comprises:
a quadrature translator operatively coupled to receive the selected passband quadrature components from said selector and to alter the selected passband quadrature components based on a first time variant predetermined pattern to provide the baseband quadrature signal; and
an in-phase translator operatively coupled to receive the selected passband in-phase components from said selector to alter the passband in-phase components based on a second time variant predetermined pattern to provide the baseband in-phase signal.

36. A downconverter according to claim 33, further comprising a decimator operatively coupled to receive the digital signal from said analog-to-digital converter and alternately provide the digital signal to said transformation network and said delay element.

37. A downconverter according to claim 36, wherein said digital translator comprises:
a quadrature translator operatively coupled to said Hilbert transformation network to alter the passband quadrature component based on a first time variant predetermined pattern to provide the baseband quadrature signal; and
an in-phase translator operatively coupled to said delay element to alter the passband in-phase component based on a second time variant predetermined pattern to provide the baseband in-phase signal.

38. A downconverter according to claim 33, wherein said digital translator further comprises a pseudorandom sequence demodulator operatively coupled to said transformation network and said delay element to alter the passband quadrature and passband in-phase components based on both the time variant predetermined pattern and a pseudorandom sequence to provide the baseband quadrature signal and the baseband in-phase signal.

39. A downconverter according to claim 33, further comprising:
an early translator operatively coupled to said Hilbert transformation network and said delay element to alter the passband quadrature and passband inphase components based on a time variant predetermined pattern to provide an early baseband quadrature signal and an early baseband in-phase signal;
a late translator operatively coupled to said Hilbert transformation network and said delay element to alter the passband quadrature and passband in-phase components based on a time variant predetermined pattern to provide a late baseband quadrature signal and a late baseband in-phase signal; and
a selector operatively coupled to said early translator, said late translator and said digital translator to select the baseband quadrature signal and the baseband in-phase signal from one of said early, late and digital translators based on a quality of the selected signals.

40. A downconverter according to claim 33, wherein the components consist of binary numbers and wherein said digital translator changes a sign of the binary numbers according to the time variant predetermined pattern.

41. A CDMA receiver, comprising:
analog-to-digital converting means for sampling an IF signal at a sampling rate to provide a digital signal;
transformation means for transforming the digital signal to provide a passband quadrature component of the digital signal and a passband in-phase component of the digital signal; and
translator means for altering and despreading the passband quadrature and passband in-phase components based on both a time variant predetermined pattern and a pseudorandom sequence to provide a baseband quadrature signal and a baseband in-phase signal.

42. A method for down-converting a signal, the method comprising the steps of:
(a) sampling an intermediate frequency signal at a sampling rate to produce a digital signal;
(b) transforming the digital signal to produce a passband quadrature component;
(c) delaying the digital signal to produce a passband in-phase component; and
(d) altering the passband quadrature and passband in-phase components based on at least one time variant predetermined pattern to provide a baseband quadrature signal and a baseband in-phase signal.

43. A method according to claim 42, further comprising the step of:
(e) alternately selecting the passband quadrature component and the passband in-phase component to provide selected components of the passband quadrature component and passband in-phase component.

44. A method according to claim 42, further comprising the step of:
(e) decimating the digital signal before transforming and delaying the digital signal in said steps (b) and (c).

45. A method according to claim 42, wherein said step (d) comprises the substep of:
(d1) pseudorandom sequence demodulating the passband quadrature and passband in-phase components based on both the time variant predetermined pattern and a pseudorandom sequence to provide the baseband quadrature signal and the baseband in-phase signal.

46. A method according to claim 45, wherein said step (d) further comprises the substeps of:
(d2) early pseudorandom sequence demodulating the passband quadrature and passband in-phase components based on both the time variant predetermined pattern and an early pseudorandom sequence to provide an early baseband quadrature signal and an early baseband in-phase signal;

(d3) late pseudorandom sequence demodulating the passband quadrature and passband in-phase components based on both the time variant predetermined pattern and a late pseudorandom sequence to provide a late baseband quadrature signal and a late baseband in-phase signal; and (d4) selecting the baseband quadrature signal and the baseband in-phase signal from one of said steps (d1), (d2) or (d3) based on a quality of the selected signals.

47. A method according to claim 42, wherein said step (a) comprises the substep of:

(a1) sampling the intermediate frequency signal, at a sampling rate an integral multiple of an intermediate frequency of the intermediate frequency signal, to produce the digital signal.

48. A method according to claim 42, wherein said step (d) comprises the substep of:

(d1) changing a sign of the passband quadrature and passband in-phase components based on at least one time variant predetermined pattern to provide a baseband quadrature signal and a baseband in-phase signal.

* * * * *